United States Patent
Mori

(10) Patent No.: US 9,197,873 B2
(45) Date of Patent: Nov. 24, 2015

(54) STEREOSCOPIC DISPLAY DEVICE AND DISPLAY METHOD OF STEREOSCOPIC DISPLAY DEVICE

(75) Inventor: Hironori Mori, Kanagawa (JP)

(73) Assignee: SONY CORPORATION, Tokyo (JP)

(*) Notice: Subject to any disclaimer, the term of this patent is extended or adjusted under 35 U.S.C. 154(b) by 220 days.

(21) Appl. No.: 13/113,366

(22) Filed: May 23, 2011

(65) Prior Publication Data

US 2011/0316991 A1 Dec. 29, 2011

(30) Foreign Application Priority Data

Jun. 24, 2010 (JP) ................................ 2010-143334

(51) Int. Cl.
*H04N 13/04* (2006.01)
*H04N 13/00* (2006.01)
*H04N 21/488* (2011.01)

(52) U.S. Cl.
CPC ......... *H04N 13/0022* (2013.01); *H04N 13/007* (2013.01); *H04N 21/488* (2013.01); *H04N 13/004* (2013.01); *H04N 13/0438* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,549,650 B1* | 4/2003 | Ishikawa et al. | ............... | 382/154 |
| 7,679,641 B2 | 3/2010 | Lipton et al. | | |
| 7,982,810 B2* | 7/2011 | Ohara | ........................... | 348/790 |
| 8,199,147 B2* | 6/2012 | Ishiyama et al. | .............. | 345/419 |
| 2005/0219261 A1* | 10/2005 | Asai et al. | ..................... | 345/613 |
| 2008/0266386 A1* | 10/2008 | Maeda | ............................ | 348/47 |
| 2010/0021141 A1* | 1/2010 | Yamashita et al. | ............ | 386/109 |
| 2010/0074594 A1* | 3/2010 | Nakamura et al. | .............. | 386/92 |
| 2010/0142924 A1* | 6/2010 | Yamashita et al. | ............. | 386/95 |
| 2010/0150529 A1* | 6/2010 | Leichsenring et al. | ........ | 386/95 |
| 2010/0157025 A1* | 6/2010 | Suh et al. | ........................ | 348/51 |
| 2010/0220175 A1* | 9/2010 | Claydon et al. | ................ | 348/43 |
| 2010/0238267 A1* | 9/2010 | Izzat et al. | ...................... | 348/43 |
| 2010/0303444 A1* | 12/2010 | Sasaki et al. | .................. | 386/248 |
| 2011/0013888 A1* | 1/2011 | Sasaki et al. | .................. | 386/353 |
| 2011/0037833 A1* | 2/2011 | Lee et al. | ........................ | 348/46 |
| 2011/0050850 A1* | 3/2011 | Yamada | .......................... | 348/43 |

(Continued)

FOREIGN PATENT DOCUMENTS

JP 4-35491 2/1992
JP 8-317429 11/1996

(Continued)

OTHER PUBLICATIONS

Combined Chinese Office Action and Search Report issued Jul. 2, 2014 in Patent Application No. 201110162091.5 (with English language translation).

Office Action issued on Dec. 18, 2013 in corresponding Japanese Patent Application No. 2010-143334.

*Primary Examiner* — Dave Czekaj
*Assistant Examiner* — Tyler W Sullivan
(74) *Attorney, Agent, or Firm* — Oblon, McClelland, Maier & Neustadt, L.L.P.

(57) ABSTRACT

A stereoscopic display device includes: a parallax adjustment section performing a parallax adjustment on each of a left-eye image and a right-eye image which are inputted; and a display section displaying the left-eye image and the right-eye image which are resultant of the parallax adjustment by the parallax adjustment section. The parallax adjustment section performs the parallax adjustment only on a region other than an OSD image region with an OSD image superposed therein in each of the left-eye image and the right-eye image.

10 Claims, 11 Drawing Sheets

(56) References Cited

U.S. PATENT DOCUMENTS

| | | | |
|---|---|---|---|
| 2011/0050853 A1* | 3/2011 | Zhang et al. | 348/44 |
| 2011/0142426 A1* | 6/2011 | Sasaki et al. | 386/337 |
| 2011/0149022 A1* | 6/2011 | Klebanov et al. | 348/42 |
| 2011/0187817 A1* | 8/2011 | Sasaki et al. | 348/42 |
| 2011/0211815 A1* | 9/2011 | Yamashita et al. | 386/353 |
| 2011/0292174 A1* | 12/2011 | Suh et al. | 348/43 |
| 2013/0010062 A1* | 1/2013 | Redmann | 348/43 |

FOREIGN PATENT DOCUMENTS

| | | |
|---|---|---|
| JP | 2009-533897 | 9/2009 |
| WO | 2010/010499 | 1/2010 |
| WO | WO 2010/010709 A1 | 1/2010 |
| WO | 2010/038388 | 4/2010 |
| WO | 2010/046824 | 4/2010 |
| WO | WO 2010038388 A1 * | 4/2010 |

* cited by examiner

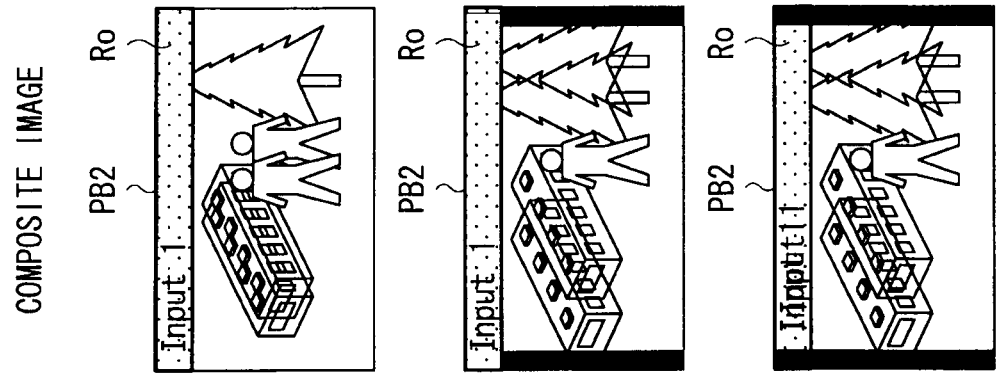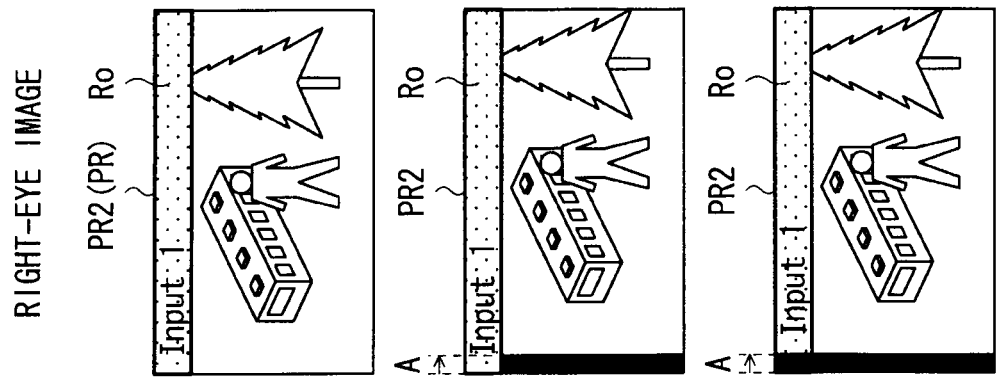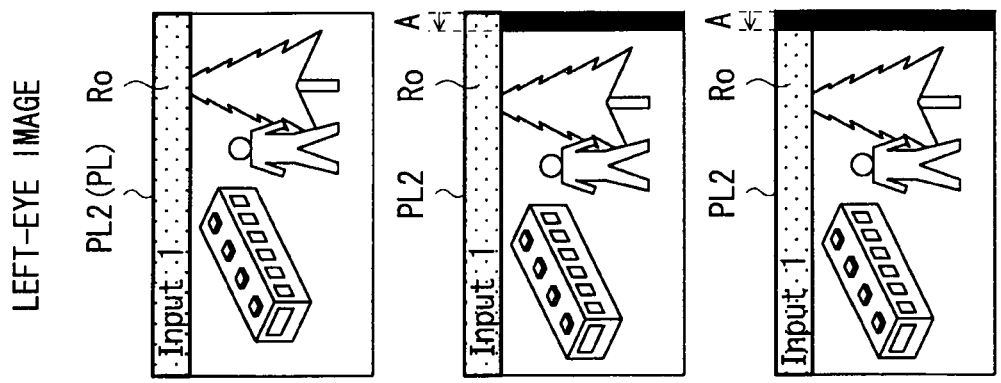
FIG. 6A
FIG. 6B
FIG. 6C

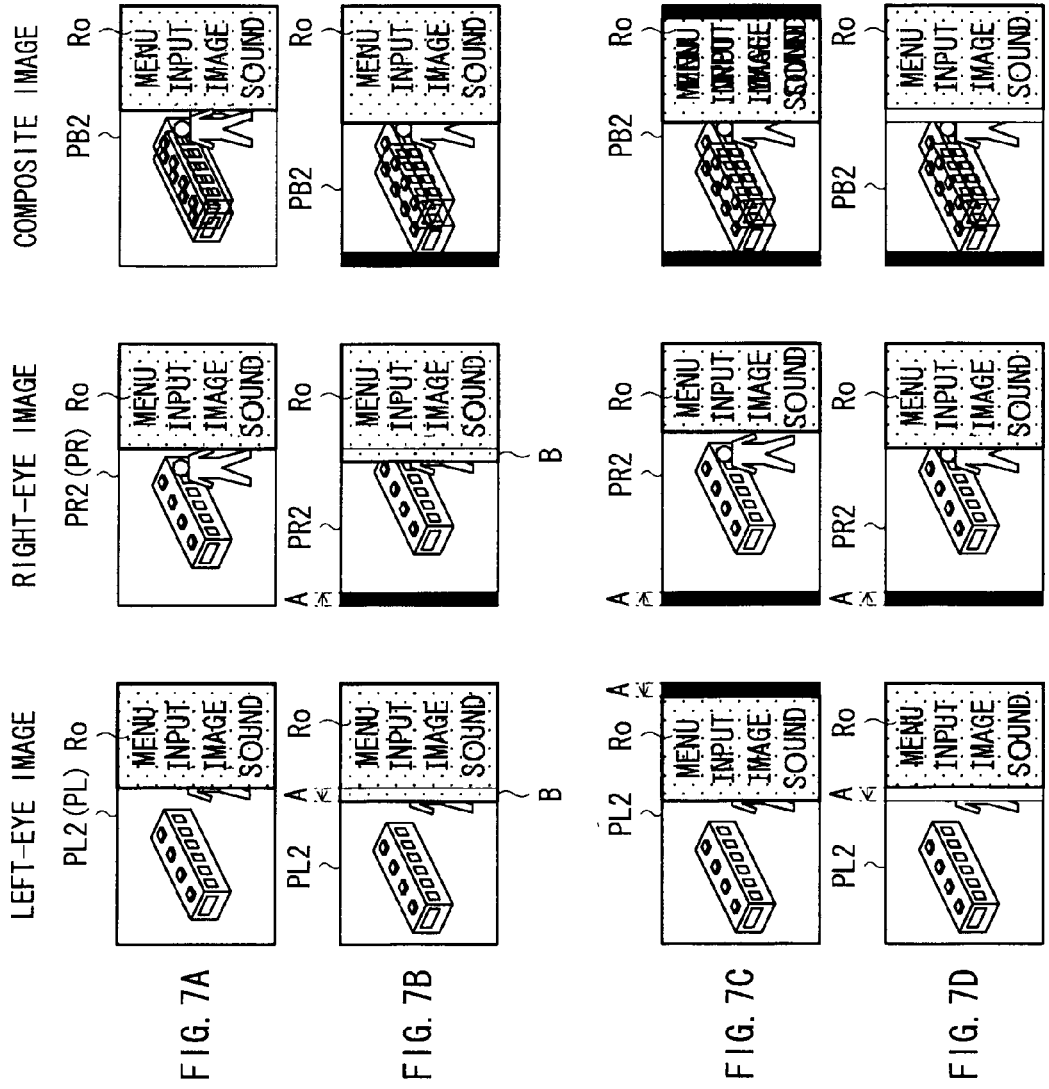

STEREOSCOPIC DISPLAY DEVICE AND DISPLAY METHOD OF STEREOSCOPIC DISPLAY DEVICE

BACKGROUND

The present disclosure contains subject matter related to that disclosed in Japanese Priority Patent Application JP 2010-143334 filed in the Japan Patent Office on Jun. 24, 2010, the entire content of which is hereby incorporated by reference.

This disclosure relates to a stereoscopic display device capable of performing stereoscopic vision displaying, and to a display method of the stereoscopic display device.

In recent years, attention has been drawn to a stereoscopic display device capable of achieving stereoscopic vision displaying. The stereoscopic vision displaying displays a left-eye image and a right-eye image that have parallax with respect to each other. The stereoscopic vision displaying makes it possible for an observer to recognize the left-eye image and the right-eye image as a stereoscopic picture having a depth, by allowing the observer to see the left-eye image and the right-eye image with his/her left and right eyes, respectively. Examples of a scheme for the stereoscopic display device include: a scheme in which the left-eye image and the right-eye image are alternately displayed in a time-divisional fashion, and in which the left-eye image and the right-eye image are observed with shutter eyeglasses that open and close in synchronization with the alternate displaying; and a scheme in which the left-eye image and the right-eye image are alternately displayed on a line basis on a display device whose polarization directions are different on the line basis, and in which the left-eye image and the right-eye image are observed with polarization eyeglasses whose left and right polarization directions are different from each other, for example. Also, there are schemes which eliminate the use of such dedicated eyeglasses, such as a lenticular lens scheme and a parallax barrier scheme. In these schemes, images seen by left and right eyes are made different from each other by simultaneous displaying of the left-eye image and the right-eye image, and by a relative positional relationship (or an angle) between a display device and the left eye and that between the display device and the right eye.

A stereoscopic effect experienced by an observer varies among individuals when the observer sees a picture by using such a stereoscopic display device. To address this circumstance, various studies have been made as to a parallax control technique by which the stereoscopic effect of a displayed picture is adjusted. For example, Japanese Unexamined Patent Application Publications No. H04-35491 and No. H08-317429 each disclose a scheme in which display positions of a left-eye image and a right-eye image are shifted in a horizontal direction and scaling such as scaling up and scaling down is performed to adjust a stereoscopic effect.

Meanwhile, in recent years, a method in which setting of an electronic device is performed by using On-Screen Display (OSD) has been in widespread use with higher functionality of the electronic device. Thus, for a display device, the method that uses the OSD is becoming common as well. This method superimposes a menu screen (an OSD image) on picture information and displays the superimposed menu screen, and allows a user to configure the settings of a device in accordance with the menu screen, to thereby achieve a user-friendly setting of the device.

SUMMARY

There may be a case where picture information, in which an OSD image as a two-dimensional image is superimposed on a stereoscopic picture, is subjected to the above-described parallax control so as to adjust a stereoscopic effect. In this case, not only a region of the stereoscopic picture for which the stereoscopic effect is supposed to be adjusted but also a region of the OSD image as the two-dimensional image may be subjected to the parallax control, which may consequently reduce visibility of the OSD image when seeing the OSD image together with the stereoscopic picture. In particular, the OSD image may be seen as double OSD images when a large parallax magnitude is set in performing the parallax control. Also, in a stereoscopic display device that utilizes dedicated eyeglasses, the OSD image may be seen double even when the eyeglasses are taken off, which consequently makes it difficult to operate a device by using a menu screen. Operation of the menu screen itself is possible when the parallax control is allowed not to be performed at the time of operating the menu screen, since this makes the region of the menu screen clearly visible in either case discussed above, for example. However, this also makes the parallax control not to be performed on the region of the stereoscopic picture as well. Thus, for example, a user may feel inconvenient when the user wishes to operate a menu while seeing both the stereoscopic vision and the menu screen, such as adjustment of image quality and switching over of inputs.

It is desirable to provide a stereoscopic display device and a display method of a stereoscopic display device, capable of keeping a reduction of visibility of an OSD image to the minimum even in a state in which a parallax control for a stereoscopic picture is performed.

A stereoscopic display device according to an embodiment of the technology includes: a parallax adjustment section performing a parallax adjustment on each of a left-eye image and a right-eye image which are inputted; and a display section displaying the left-eye image and the right-eye image which are resultant of the parallax adjustment by the parallax adjustment section. The parallax adjustment section performs the parallax adjustment only on a region other than an OSD image region with an OSD image superposed therein in each of the left-eye image and the right-eye image.

A display method of a stereoscopic display device according to an embodiment of the technology includes: performing a parallax adjustment on each of a left-eye image and a right-eye image which are inputted, in which the parallax adjustment is performed only on a region other than an OSD image region with an OSD image superposed therein in each of the left-eye image and the right-eye image; and displaying the left-eye image and the right-eye image which are resultant of the parallax adjustment.

In the stereoscopic display device and the display method of the stereoscopic display device according to the embodiments of the technology, the parallax adjustment is performed on the left-eye image and on the right-eye image. When the OSD image is superimposed on the left-eye image and on the right-eye image, the parallax adjustment is performed only on the region other than the OSD image region with the OSD image superposed therein.

Advantageously, the stereoscopic display device further includes a superimposing section superimposing the OSD image on each of a left-eye image and a right-eye image and generating OSD region information that indicates the OSD image region, and then supplying the parallax adjustment section with the OSD region information as well as the left-eye image and the right-eye image each including a superimposed OSD image. The parallax adjustment section determines the region other than the OSD image region, based on the OSD region information.

Advantageously, the stereoscopic display device further includes an input section receiving both the left-eye image and the right-eye image with the superimposed OSD image therein as well as OSD region information, in which the OSD region information indicates the OSD image region. The parallax adjustment section determines the region other than the OSD image region, based on the OSD region information.

Advantageously, the parallax adjustment in the parallax adjustment section includes an image-shifting process performed on each of the inputted left-eye image and the inputted right-eye image.

Advantageously, the parallax adjustment section interpolates, when part of the left-eye image or the right-eye image in an adjacent region which is adjacent to the OSD image region is lost due to the image-shifting process, part of the OSD image in a region that adjoins the adjacent region into the adjacent region.

Advantageously, the parallax adjustment section so performs, when part of the left-eye image or the right-eye image in an adjacent region which is adjacent to the OSD image region is lost due to the image-shifting process, the image-shifting process on an image of a boundary region between the OSD image region and the region other than the OSD image region, that a shift magnitude in the image of the boundary region gradually changes depending on a position coordinate in a shift direction of the image-shifting process. As used herein, the wording "gradually changes" refers to, for example but not limited to, a state in which the shift magnitude changes smoothly, or a state in which the shift magnitude changes in a stepwise fashion.

Advantageously, the image-shifting process is performed based on a product of the shift magnitude and an image shift processing function, the shift magnitude being predetermined to have a fixed value, and the image-shift processing function showing change in its function value only within a range corresponding to the boundary region, of the position coordinate range in the shift direction of the image-shifting process.

Advantageously, the image-shift processing function indicates a value of '0' in a region other than the boundary region within the OSD image region, and indicates a value of '1' in a region other than the boundary region within a region other than the OSD image region.

Advantageously, the OSD image is transparent, and the left-eye image and the right-eye image, each of which is before being superimposed with the OSD image, are displayed transparently in the OSD image region.

According to the stereoscopic display device and the display method of the stereoscopic display device of the embodiments of the technology, the parallax adjustment is performed only on the region other than the OSD image region with the OSD image superposed therein. Therefore, it is possible to keep a reduction of visibility of the OSD image to the minimum even in a state in which a parallax control for a stereoscopic picture is performed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 6A to 6C are explanatory drawings illustrating an exemplary operation of the parallax adjustment section according to the first embodiment.

FIGS. 7A to 7D are explanatory drawings illustrating another exemplary operation of the parallax adjustment section according to the first embodiment.

DETAILED DESCRIPTION

In the following, some embodiments of the technology will be described in detail with reference to the accompanying drawings. The description will be given in the following order.
1. First Embodiment
2. Second Embodiment

1. First Embodiment

Configuration Example

Exemplary Overall Configuration

Figure 1:
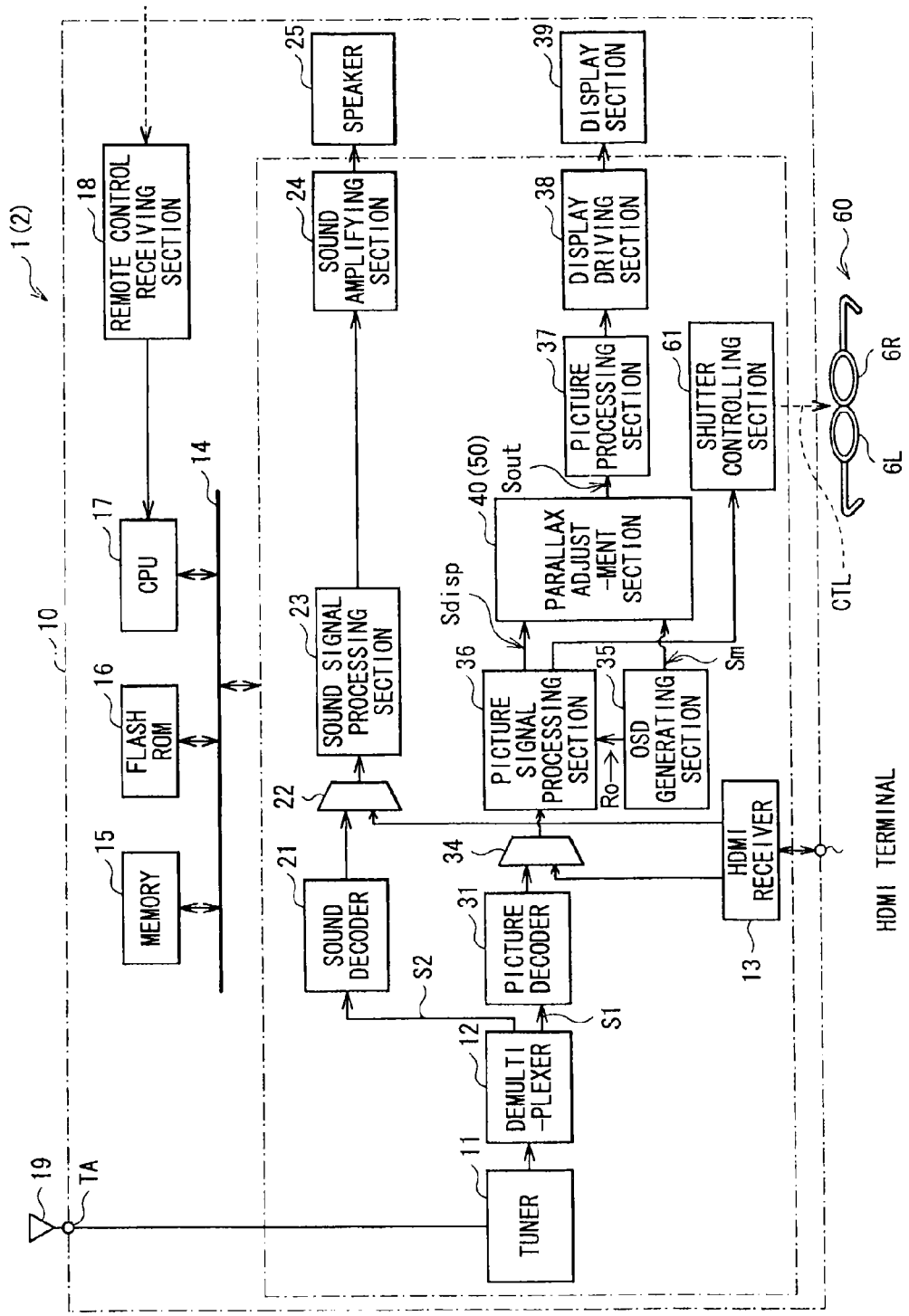
FIG. 1 is a block diagram illustrating an exemplary configuration of a stereoscopic display system according to embodiments of the technology.

FIG. 1 illustrates an exemplary configuration of a stereoscopic display device according to a first embodiment of the technology. It is to be noted that this embodiment is applicable to and embodies a display method of a stereoscopic display device according to an embodiment of the technology. Hence, description on the display method of the stereoscopic display device will be given collectively in conjunction with this embodiment. A stereoscopic display system 1 is a display system by which stereoscopic vision displaying is performed by using shutter eyeglasses. The stereoscopic display system 1 is provided with a stereoscopic display device 10 and shutter eyeglasses 60.

The stereoscopic display device 10 includes a tuner 11, an OSD generating section 35, a picture signal processing section 36, a parallax adjustment section 40, a display section 39, and a shutter controlling section 61.

The tuner 11 selects a desired signal (a stream) from a broadcast wave. The broadcast wave may be received at an antenna 19 and supplied to the tuner 11 through an antenna terminal TA. The stream selected in the tuner 11 is supplied to a demultiplexer 12. The demultiplexer 12 has a function of extracting a picture signal S1 and a sound signal S2 from the stream. The demultiplexer 12 further has functions of supplying the picture signal S1 to a picture decoder 31, and supplying the sound signal S2 to a sound decoder 21. The picture signal S1 may be a signal in which a left-eye image and a right-eye image that have parallax with respect to each other are alternately arranged.

A sound signal decoded in the sound decoder 21 is supplied to a selector 22 by which a sound signal to be outputted as an audio output is selected. In this embodiment, the selector 22 may select one of the sound signal supplied from the sound decoder 21 and a sound signal supplied through an HDMI (High Definition Multimedia Interface) receiver 13 from an unillustrated external device. The sound signal selected in the selector 22 is subjected, in a sound signal processing section 23, to a sound signal process such as a surround process, following which the processed sound signal is amplified in a sound amplifying section 24, and a resultant is thereafter outputted as a sound from a speaker 25.

A picture signal decoded in the picture decoder 31 is supplied to a selector 34 by which a picture signal to be displayed is selected. In this embodiment, the selector 34 may select one of the picture signal supplied from the picture decoder 31 and a picture signal supplied through the HDMI receiver 13 from the unillustrated external device.

The OSD generating section 35 generates an OSD image Ro used for performing setting of the stereoscopic display device 10. The OSD generating section 35 further has a function of generating an OSD mask signal Sm. The OSD mask signal Sm represents in a display screen an image region at which the OSD image Ro is displayed.

The picture signal processing section 36 applies a picture signal process such as a contrast enhancement, an edge enhancement, and an interlaced-to-progressive conversion to the picture signal selected in the selector 34. The picture signal processing section 36 further has functions of superimposing the OSD image Ro supplied from the OSD generating section 35 onto a picture applied with the picture signal process, and outputting a resultant as a picture signal Sdisp. The picture signal processing section 36 also has a function of generating a signal by which the shutter controlling section 61 is controlled, and outputting the generated signal.

Figure 2A:
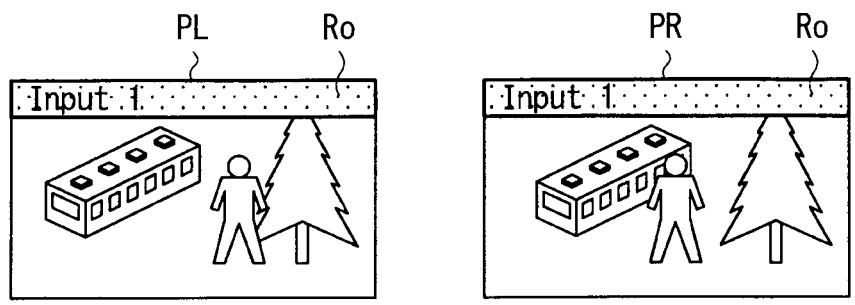
FIGS. 2A and 2B are schematic drawings for describing an OSD mask signal according to the embodiments.
Figure 2B:
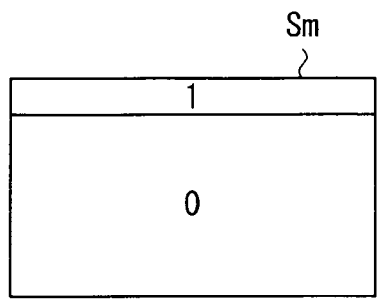

FIGS. 2A and 2B illustrate a relationship in the display screen between the display region of the OSD image Ro and the OSD mask signal Sm, in which FIG. 2A illustrates a left-eye image PL and a right-eye image PR each superimposed with the OSD image Ro, and FIG. 2B illustrates the OSD mask signal Sm on the display screen. In this embodiment, the OSD image Ro may be arranged on each upper part of the left-eye image PL and the right-eye image PR that have parallax with respect to each other, as illustrated in FIG. 2A. In this case, the OSD mask signal Sm has a value of "1" in the region in which the OSD image Ro is arranged, and has a value of "0" in a region other than the region in which the OSD image Ro is arranged, as illustrated in FIG. 2B.

The parallax adjustment section 40 adjusts a parallax between the left-eye image PL and the right-eye image PR included in the picture signal Sdisp supplied from the picture signal processing section 36, and outputs a resultant as a picture signal Sout. As will be described later, the parallax adjustment section 40 adjusts, based on the OSD mask signal Sm, the parallax only with respect to the image region other than the OSD image Ro.

Figure 3:
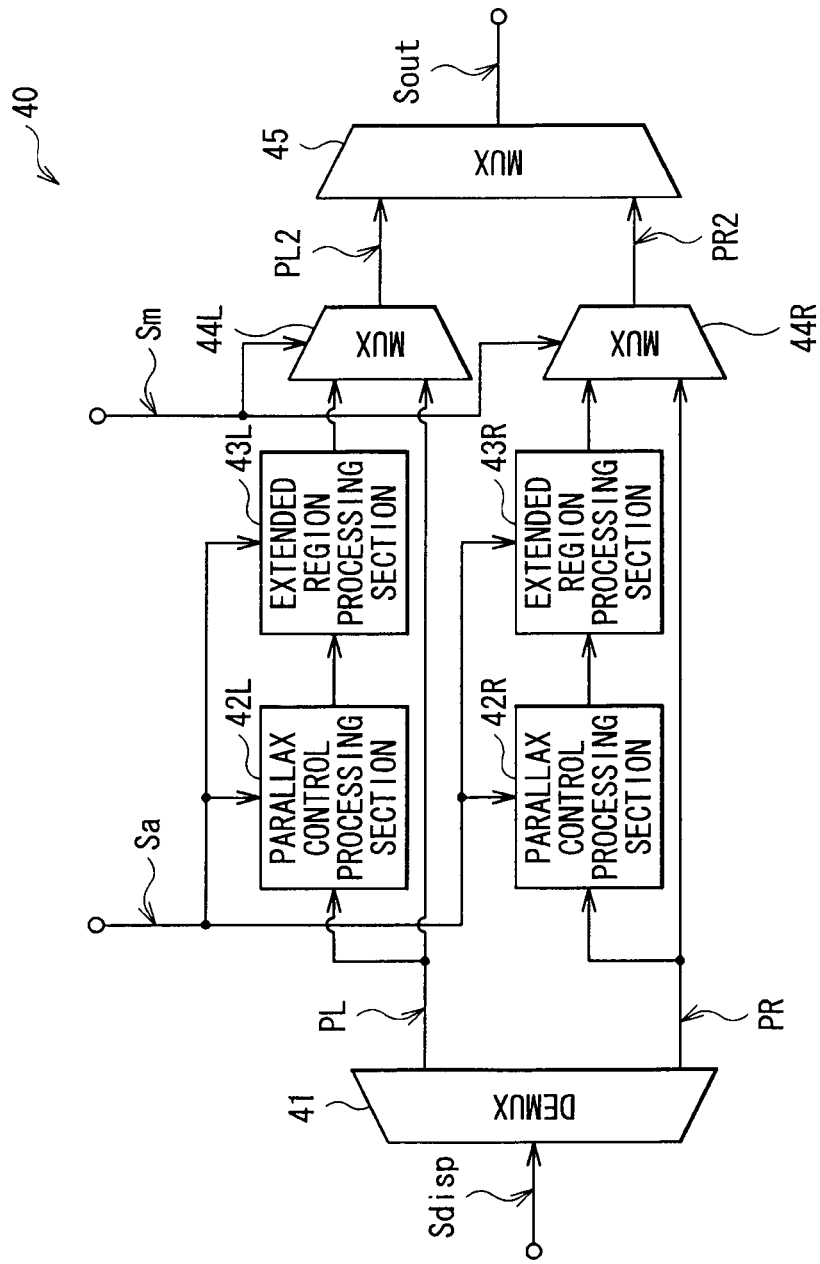
FIG. 3 is a block diagram illustrating an exemplary configuration of a parallax adjustment section according to a first embodiment of the technology.

FIG. 3 illustrates an exemplary configuration of the parallax adjustment section 40. The parallax adjustment section 40 includes a demultiplexer (denoted as DEMUX) 41, parallax control processing sections 42L and 42R, extended region processing sections 43L and 43R, and multiplexers (denoted as MUX) 44L, 44R, and 45.

The demultiplexer 41 separates the supplied picture signal Sdisp into a picture signal including the left-eye image PL and a picture signal including the right-eye image PR.

The parallax control processing section 42L performs, based on a parallax control signal Sa supplied through a later-described internal bus 14 from a later-described CPU (Central Processing Unit) 17, an image shift of the left-eye image PL in a horizontal direction, whereas the parallax control processing section 42R performs, based on the parallax control signal Sa, an image shift of the right-eye image PR in the horizontal direction. The parallax control signal Sa includes a parallax magnitude A by which an amount of the image shifts is instructed. The parallax control processing sections 42L and 42R respectively perform the image shifts in directions opposite to each other on the images supplied respectively thereto, to thereby adjust the parallax.

As will be described later, the extended region processing sections 43L and 43R each perform, when an image of a region adjacent to the OSD image Ro is lost by performing the image shifts in the parallax control processing sections 42L and 42R, an image process (an extended region process) on that region.

The multiplexer 44L multiplexes, based on the OSD mask signal Sm, a left-eye image supplied from the extended region processing section 43L and the left-eye image PL supplied from the demultiplexer 41. More specifically, the multiplexer 44L handles the left-eye image PL supplied from the demultiplexer 41 as an input thereto with respect to the image region where the value of the OSD mask signal indicates "1", and handles the left-eye image supplied from the extended region processing section 43L as an input thereto with respect to the image region where the value of the OSD mask signal indicates "0", to thereby generate a left-eye image PL2. As with the multiplexer 44L, the multiplexer 44R multiplexes, based on the OSD mask signal Sm, a right-eye image supplied from the extended region processing section 43R and the right-eye image PR supplied from the demultiplexer 41. More specifically, the multiplexer 44R handles the right-eye image PR supplied from the demultiplexer 41 as an input thereto with respect to the image region where the value of the OSD mask signal indicates "1", and handles the right-eye image supplied from the extended region processing section 43R as an input thereto with respect to the image region where the value of the OSD mask signal indicates "0", to thereby generate a right-eye image PR2. With this configuration, the multiplexers 44L and 44R are each supplied with the OSD image Ro from the demultiplexer 41, and are supplied with the images other than the OSD image Ro from the extended region processing sections 43L and 43R, respectively. In other words, in the parallax adjustment section 40, the image shifts are performed only with respect to the image regions other than the OSD image Ro, and the image shifts are not performed on the image regions that include the OSD image Ro.

The multiplexer 45 so multiplexes a picture signal including the left-eye image PL2 supplied from the multiplexer 44L and a picture signal including the right-eye image PR2 supplied from the multiplexer 44R that the left-eye image PL2 and the right-eye image PR2 are alternately arranged, and outputs a resultant as the picture signal Sout.

The picture signal multiplexed in the multiplexer 45 is applied, in a picture processing section 37, with a predetermined picture process such as a gamma process and an overdrive process, following which a resultant is supplied to a display driving section 38. The display driving section 38 drives, based on the picture signal supplied from the picture processing section 37, the display section 39. The display section 39 displays, based on a signal supplied from the display driving section 38, the left-eye image PL2 and the right-eye image PR2 alternately in a time-divisional fashion.

The shutter controlling section 61 controls, based on the signal supplied from the picture signal processing section 36, the shutter eyeglasses 60. More specifically, the shutter controlling section 61 sends a shutter control signal CTL, by which the shutter eyeglasses 60 are controlled, to the shutter eyeglasses 60. The shutter control signal CTL may be transmitted to the shutter eyeglasses 60 through a wireless communication utilizing such as an infrared and a radio wave, for example.

The stereoscopic display device 10 includes a memory 15, a flash ROM 16, and the CPU 17 which are mutually connected through the internal bus 14. The internal bus 14 may connect all of the circuit blocks discussed above, so that those blocks are able to exchange information through the internal bus 14. The stereoscopic display device 10 further includes a remote control receiving section 18. The remote control receiving section 18 receives instructions from an unillustrated remote control, and supplies a signal thereof to the CPU 17.

The shutter eyeglasses 60 are used by an observer (not illustrated) of the stereoscopic display device 10 to thereby enable a stereoscopic vision. The shutter eyeglasses 60 have a left-eye shutter 6L and a right-eye shutter 6R. The left-eye shutter 6L and the right-eye shutter 6R are each configured by a light-shielding shutter such as a liquid crystal shutter, for example. Light-shield states (an open state and a closed state) of the left-eye shutter 6L and the right-eye shutter 6R are controlled by the shutter control signal CTL supplied from the shutter controlling section 61. More specifically, the left-eye shutter 6L and the right-eye shutter 6R are respectively controlled to be open and closed at timings synchronized with the alternate displaying of the left-eye image PL2 and the right-eye image PR2, which are alternately displayed in a time-divisional fashion on the display section 39.

Here, the OSD generating section 35 and the picture signal processing section 36 correspond to an illustrative example of a "superimposing section" according to one embodiment of the present disclosure. The OSD mask signal Sm corresponds to an illustrative example of an "OSD region information" according to one embodiment of the present disclosure. The parallax magnitude A corresponds to an illustrative example of a "shift magnitude" according to one embodiment of the present disclosure.

(Operation and Action)

An operation and an action of the stereoscopic display system 1 according to the first embodiment will now be described.

(Outline of Overall Operation)

The tuner 11 selects a desired signal (a stream) from the broadcast wave received at the antenna 19. The demultiplexer 12 extracts the picture signal S1 and the sound signal S2 from the selected stream.

The sound decoder 21 decodes the sound signal S2. The selector 22 may select one of the sound signal supplied from the sound decoder 21 and the sound signal supplied through the HDMI receiver 13 from the unillustrated external device. The sound signal processing section 23 performs a predetermined sound signal process on the sound signal selected in the selector 22. The sound amplifying section 24 amplifies the sound signal supplied from the sound signal processing section 23 to drive the speaker 25. The speaker 25 outputs the sound signal as a sound.

The picture decoder 31 decodes the picture signal S1. The selector 34 may make a selection between the picture signal supplied from the picture decoder 31 and the picture signal supplied through the HDMI receiver 13 from the unillustrated external device. The OSD generating section 35 generates the OSD image Ro, and also generates the OSD mask signal Sm. The picture signal processing section 36 applies a predetermined picture signal process to the picture signal selected in the selector 34, and superimposes the OSD image Ro supplied from the OSD generating section 35 thereon. The picture signal processing section 36 further outputs the resultant as the picture signal Sdisp, and generates the signal by which the shutter controlling section 61 is controlled. The parallax adjustment section 40 subjects, based on the OSD mask signal Sm, the left-eye image PL and the right-eye image PR included in the picture signal Sdisp supplied from the picture signal processing section 36 to the adjustment of the parallax with respect to the image regions other than the OSD image Ro, and outputs the resultant as the left-eye image PL2 and the right-eye image PR2. The picture processing section 37 performs a predetermined picture process on the signal supplied from the parallax adjustment section 40. The display driving section 38 drives, based on the signal supplied from the picture processing section 37, the display section 39. The display section 39 displays, based on the signal supplied from the display driving section 38, the left-eye image PL2 and the right-eye image PR2 alternately in a time-divisional fashion. The shutter controlling section 61 controls, based on the signal supplied from the picture signal processing section 36, the shutter eyeglasses 60. The left-eye shutter 6L and the right-eye shutter 6R of the shutter eyeglasses 60 are respectively controlled to be open and closed at timings synchronized with the alternate displaying of the left-eye image PL2 and the right-eye image PR2 which are displayed on the display section 39.

Figure 4A:
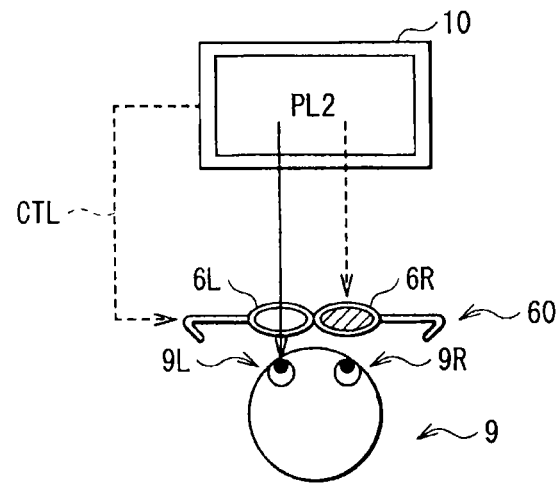
FIGS. 4A and 4B schematically illustrate an exemplary operation of the stereoscopic display system according to the first embodiment.
Figure 4B:
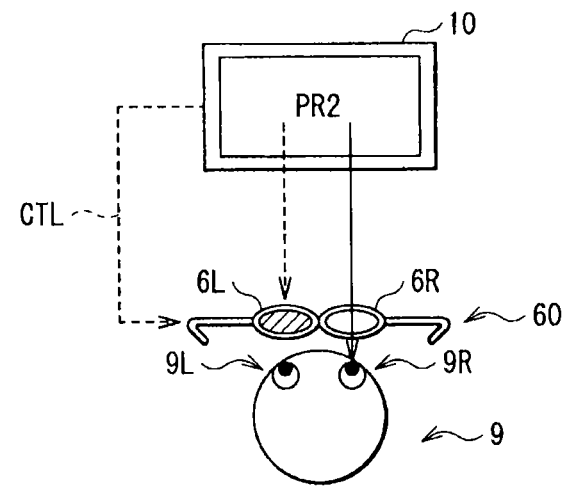

FIGS. 4A and 4B schematically illustrate an overall operation of the stereoscopic display system 1, in which FIG. 4A illustrates an operation when the left-eye image PL2 is displayed, whereas FIG. 4B illustrates an operation when the right-eye image PR2 is displayed. When the left-eye image PL2 is being displayed on the stereoscopic display device 10, the left-eye shutter 6L of the shutter eyeglasses 60 is open and the right-eye shutter 6R thereof is closed as illustrated in FIG. 4A. At this time, an observer 9 sees the left-eye image PL2 with his/her left eye 9L. On the other hand, when the right-eye image PR2 is being displayed on the stereoscopic display device 10, the left-eye shutter 6L of the shutter eyeglasses 60 is closed and the right-eye shutter 6R thereof is open as illustrated in FIG. 4B. At this time, the observer 9 sees the right-eye image PR2 with his/her right eye 9R. A repetition of the operations illustrated in FIGS. 4A and 4B alternately makes it possible for the observer 9 to recognize a picture configured of a series of those images as a stereoscopic picture having a depth, since there is a parallax between the left-eye image PL2 and the right-eye image PR2.

(Operation of Parallax Adjustment Section 40)

In the following, an example of the parallax adjustment based on the image shifts will be discussed first as a basic operation of the parallax adjustment section 40.

Figure 5A:
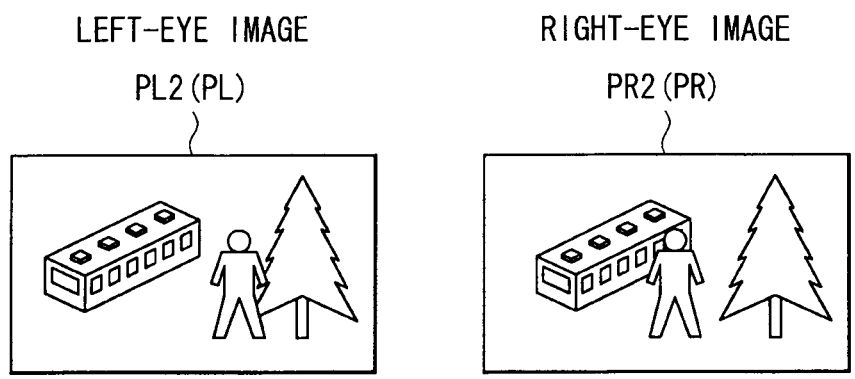
FIGS. 5A and 5B are explanatory drawings illustrating an exemplary operation of the parallax adjustment section according to the first embodiment.
Figure 5B:
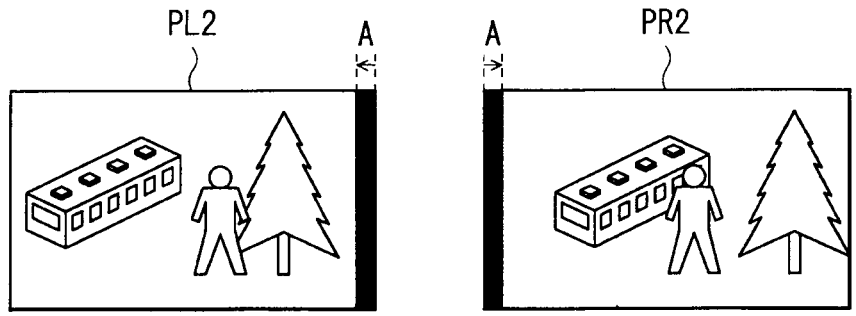

FIGS. 5A and 5B illustrate operations of the parallax adjustment section 40, in which FIG. 5A illustrates the left-eye image PL2 and the right-eye image PR2 when the parallax adjustment is not performed, whereas FIG. 5B illustrates the left-eye image PL2 and the right-eye image PR2 when the parallax adjustment is so performed that a screen is retracted. It is to be noted that the left-eye image PL2 and the right-eye image PR2 illustrated in FIG. 5A are the same as the left-eye image PL and the right-eye image PR that are inputted to the parallax adjustment section 40, respectively, since the left-eye image PL2 and the right-eye image PR2 illustrated in FIG. 5A have not been subjected to the parallax adjustment in the parallax adjustment section 40.

As illustrated in FIG. 5B, when the parallax adjustment is so performed in the parallax control processing sections 42L and 42R as to shift (as to perform the image shift of) the left-eye image PL by the parallax magnitude A in a left direction and to shift (as to perform the image shift of) the right-eye image PR by the parallax magnitude A in a right direction, the observer 9 wearing the shutter eyeglasses 60 and observing those images experiences as if the screen is retracted in accordance with the parallax magnitude A. On the other hand, when the parallax adjustment is so performed in the parallax control processing sections 42L and 42R as to shift (as to perform the image shift of) the left-eye image PL by the parallax magnitude A in the right direction and to shift (as to perform the image shift of) the right-eye image PR by the parallax magnitude A in the left direction, the observer 9 experiences as if the screen is projected or popped up in accordance with the parallax magnitude A.

Now, operations of the parallax adjustment when an input image is superimposed with the OSD image Ro will be discussed with reference to some examples.

First, description will be given on an example where the OSD image Ro, which is laterally long throughout an entire region from one end to the other end of the screen in a horizontal direction, is superimposed on the input image.

FIGS. 6A to 6C each illustrate: the left-eye image PL2 when the laterally-long OSD image Ro is superimposed on the input image; the right-eye image PR2 when the laterally-long OSD image Ro is superimposed on the input image; and a composite image PB2 when those left and right-eye images PL2 and PR2 are simply overlapped with each other to combine the same. FIG. 6A illustrates a case where the parallax adjustment is not performed in the parallax adjustment section 40, FIG. 6B illustrates a case where the parallax adjustment is performed only on the image region other than the OSD image Ro, and FIG. 6C illustrates, as a first comparative example, a case where the parallax adjustment is performed on the entire screen. It is to be noted that the composite image PB2 is an image in which the left-eye image PL2 and the right-eye image PR2 are simply overlapped as described above, and corresponds to an image observed when the observer 9 sees the same without wearing the shutter eyeglasses 60.

As illustrated in FIG. 6B, the parallax adjustment section 40 operates to perform the image shift only on the image region other than the OSD image Ro, and operates not to perform the image shift on the image region of the OSD image Ro. More specifically, with reference to FIG. 3, the multiplexers 44L and 44R are supplied respectively with the images, each of which is the image before the parallax adjustment is performed, from the demultiplexer 41 with respect to the image region where the OSD mask signal Sm indicates "1" (i.e., the region of the OSD image Ro), and are supplied respectively with the images, each of which is the image already applied with the parallax adjustment, from the extended region processing sections 43L and 43R with respect to the image region where the OSD mask signal Sm indicates "0" (i.e., the region other than the OSD image Ro). Thereby, the parallax adjustment is not performed on the OSD image Ro, so that the OSD image Ro will not be seen in a doubled fashion as illustrated by the composite image PB2 in FIG. 6B. This makes it possible for both the observer 9 wearing the shutter eyeglasses 60 and the observer 9 not wearing the shutter eyeglasses 60 to clearly or unambiguously see the OSD image Ro. That is, the stereoscopic display system 1 makes it possible to perform the parallax adjustment on the image region other than the OSD image Ro, while achieving high visibility for the OSD image Ro.

In contrast, in the case where the parallax adjustment is performed on the entire screen as illustrated in FIG. 6C according to the first comparative example, not only the image region other than the OSD image Ro but also the image region of the OSD image Ro is subjected to the parallax adjustment involving the image shifts. Thereby, for the observer 9 wearing no shutter eyeglasses 60, the OSD image Ro is seen double as illustrated by the composite image PB2 in FIG. 6C, by which the visibility of the OSD image Ro is reduced. Also, even for the observer 9 wearing the shutter eyeglasses 60, it is likely that the OSD image Ro is seen double when the large parallax magnitude A is set, for example.

Thus, the stereoscopic display system 1 uses the OSD mask signal Sm to selectively perform the parallax adjustment involving the image shifts. This makes it possible to allow the parallax adjustment to be performed with respect to the image region where the parallax adjustment is to be desirably performed, and to allow the parallax adjustment not to be performed with respect to the image region where the parallax adjustment does not have to be performed (i.e., the region of the OSD image Ro). Hence, it is possible to adjust the parallax without reducing the visibility of the OSD image Ro.

Next, description will be given on an example where the OSD image Ro, which is vertically-long throughout an entire region from one end to the other end of the screen in a perpendicular direction, is superimposed on the input image. In this example, the image of the region adjacent to the OSD image Ro is lost when the image shifts are performed. Thus, it is desirable that an image process (the extended region process) be performed on that region as discussed below.

FIGS. 7A to 7D each illustrate: the left-eye image PL2 when the vertically-long OSD image Ro is superimposed on the input image; the right-eye image PR2 when the vertically-long OSD image Ro is superimposed on the input image; and the composite image PB2 thereof. FIG. 7A illustrates a case where the parallax adjustment is not performed in the parallax adjustment section 40, and FIG. 7B illustrates a case where the parallax adjustment and the extended region process are performed on the image region other than the OSD image Ro. FIG. 7C illustrates, as a second comparative example, a case where only the parallax adjustment is performed on the entire screen, and FIG. 7D illustrates, as a third comparative example, a case where only the parallax adjustment is performed on the image region other than the OSD image Ro.

As in the case of FIG. 6B, the parallax adjustment section 40 operates to perform the image shift only on the image region other than the OSD image Ro, and operates not to perform the image shift on the image region of the OSD image Ro, as illustrated in FIG. 7B. Thereby, the parallax adjustment is not performed on the OSD image Ro, so that the OSD image Ro will not be seen in a doubled fashion as illustrated by the composite image PB2 in FIG. 7B.

Also, the parallax adjustment section 40 performs a process of enlarging the OSD image Ro (i.e., an extended region B). This is performed for, since the image of the region adjacent to the OSD image Ro is lost when the image shifts are performed as discussed below with reference to the third comparative example, a purpose of preventing an image from being unnatural as seen by the observer due to the extension of the OSD image Ro to that region.

In the case where only the parallax adjustment is performed on the entire screen as illustrated in FIG. 7C according to the second comparative example, not only the image region other than the OSD image Ro but also the image region of the OSD image Ro is subjected to the parallax adjustment involving the image shifts, as in the case of the first comparative example illustrated in FIG. 6C. Thereby, for the observer 9 wearing no shutter eyeglasses 60, the OSD image Ro is seen double as illustrated by the composite image PB2 in FIG. 7C, by which the visibility of the OSD image Ro is reduced. Also, even for the observer 9 wearing the shutter eyeglasses 60, it is likely that the OSD image Ro is seen double when the large parallax magnitude A is set, for example.

Also, in the case where only the parallax adjustment is performed on the image region other than the OSD image Ro as illustrated in FIG. 7D according to the third comparative example, the OSD image Ro will not be seen double since the parallax adjustment is not performed on the image region of the OSD image Ro. However, since each of the images other than the OSD image R is subjected to the image shift by the parallax magnitude A, the image of the region adjacent to the OSD image Ro is lost in the left-eye image PL2 in this case. A width of the region where the image is lost corresponds to the parallax magnitude A which is an amount of the image shift. Thereby, it is likely that the observer 9 feels a displayed image as unnatural. For example, although a person is displayed in a region adjacent to the OSD image Ro in the right-eye image PR2 illustrated in FIG. 7D, the person displayed in the right-eye image PR2 will not be displayed in the left-eye image PL2 since an image of that region is lost in the left-eye image PL2. In this case, the observer 9 consequently sees the person only with his/her right eye, which may strike the observer 9 as unnatural.

In contrast, the stereoscopic display system 1 extends the OSD image Ro to the region in which the image is lost. More specifically, the extended region processing sections 43L and 43R of the parallax adjustment section 40 each extend, based on the parallax control signal Sa, the OSD image Ro for the region of the width corresponding to the parallax magnitude A that is adjacent to the OSD image Ro (i.e., the extended region B). In this embodiment, the extended region processing sections 43L and 43R each operate to extract colors of pixels near the extended region B in the OSD image Ro and to apply (interpolate) those colors to the extended region B, for example. Thus, the extended region process is performed on both the left-eye image PL and the right-eye image PR, thereby making it less likely for the observer 9 to feel the unnaturalness discussed above.

(Effect)

According to the first embodiment of the technology, the OSD mask signal Sm is used to selectively perform the parallax adjustment involving the image shifts. Therefore, it is possible to adjust the parallax without reducing the visibility of the OSD image Ro.

Also, according to the first embodiment, when the image of the region adjacent to the OSD image Ro is lost by the image shifts, the OSD image Ro is extended to that region. Therefore, it is possible to allow the observer less likely to feel the unnaturalness.

2. Second Embodiment

A stereoscopic display system 2 according to a second embodiment of the technology will now be described. The second embodiment has a configuration similar to that of the first embodiment described above with reference to FIG. 1 etc., except that a method of a process performed on the extended region B is different from that of the first embodiment. More specifically, in the first embodiment, the image shifts are performed on the image regions other than the OSD image Ro, and the color of the OSD image Ro is applied to portions where the image is lost thereby. In the second embodiment, the image shifts are so performed on a boundary region between the OSD image Ro and an outside of the OSD image Ro, that the parallax magnitude A is gradually changed. In other words, the stereoscopic display system 2 includes a parallax adjustment section 50 that performs such a process on the extended region B. Note that the same or equivalent elements as those of the stereoscopic display system 1 according to the first embodiment described above are denoted with the same reference numerals, and will not be described in detail.

Figure 8:
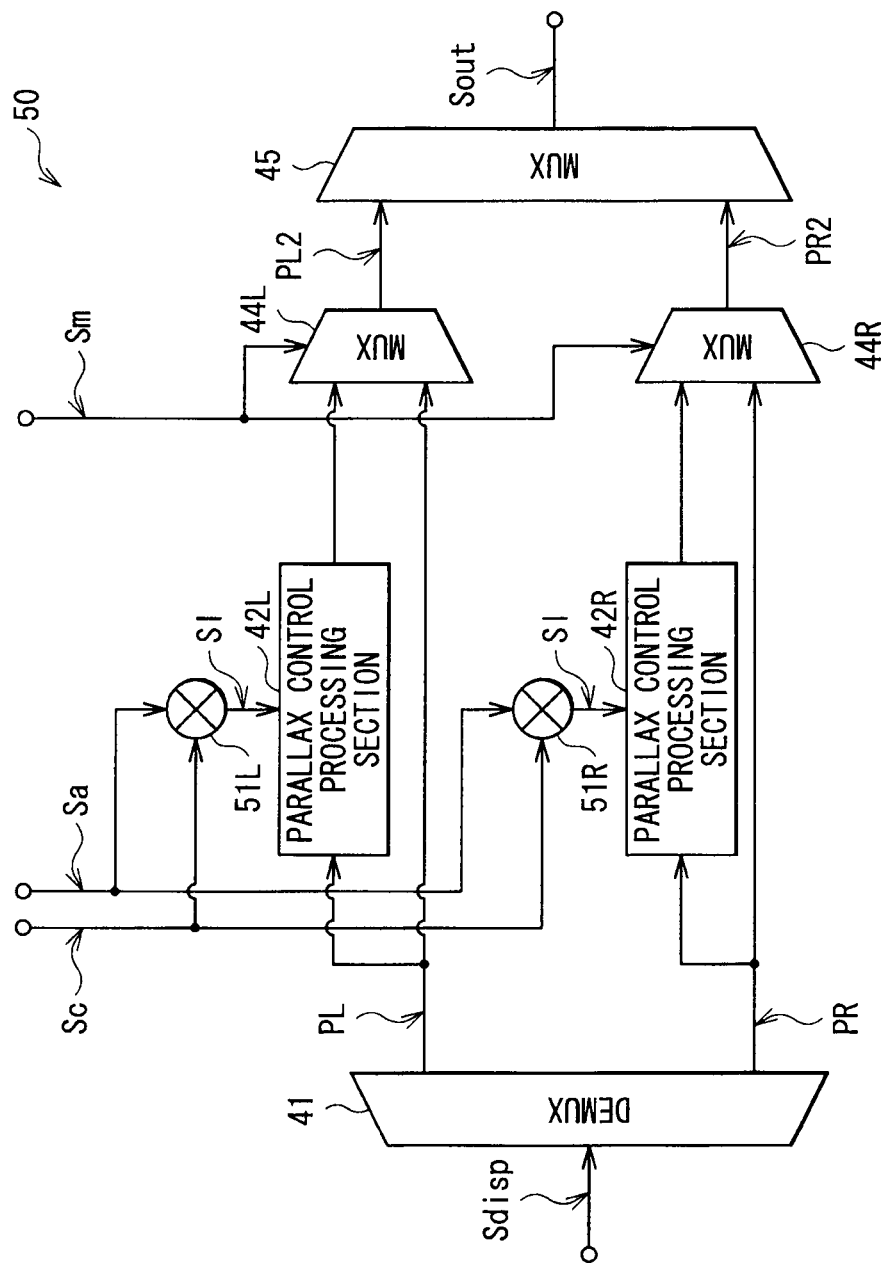
FIG. 8 is a block diagram illustrating an exemplary configuration of a parallax adjustment section according to a second embodiment of the technology.

FIG. 8 illustrates an exemplary configuration of the parallax adjustment section 50. The parallax adjustment section 50 includes multipliers 51L and 51R. The multipliers 51L and 51R each obtain a product of the parallax control signal Sa (the parallax magnitude A) and an image-shift processing function Sc, and each supply a result thereof to the corresponding parallax control processing section 42L or 42R as a parallax control signal Sl. The image-shift processing function Sc is supplied through the internal bus 14 from the CPU 17, as with the parallax control signal Sa. As compared with the parallax adjustment section 40, the extended region processing sections 43L and 43R are eliminated in the parallax adjustment section 50.

Figure 9:
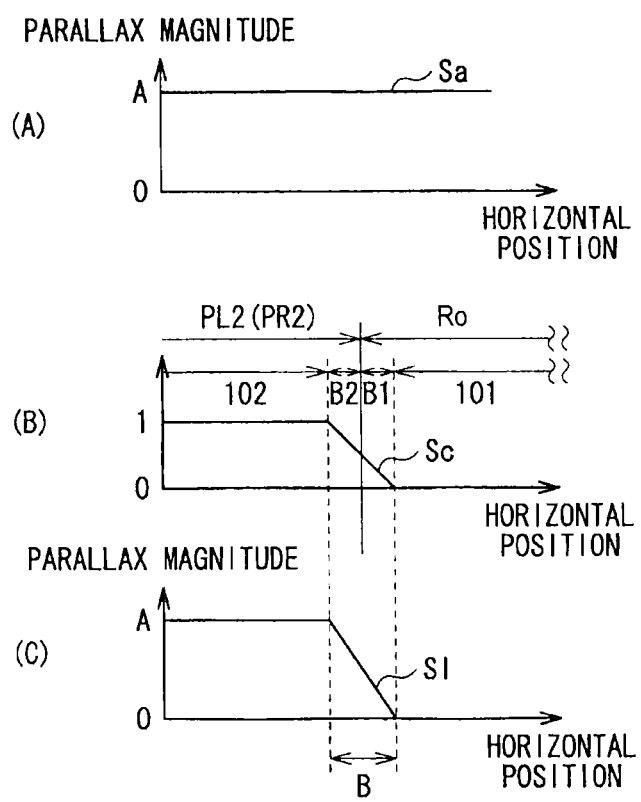
FIG. 9 is a waveform chart illustrating an exemplary operation of a multiplier according to the second embodiment.

FIG. 9 illustrates exemplary waveforms of input-output signals of the multipliers 51L and 51R, in which (A) illustrates a waveform of the parallax control signal Sa, (B) illustrates a waveform of the image-shift processing function Sc, and (C) illustrates a waveform of the parallax control signal Sl. In FIG. 9, a horizontal axis represents a horizontal position of a display screen. The parallax control signal Sa has the fixed parallax magnitude A irrespective of the horizontal position, as illustrated in (A) of FIG. 9. The image-shift processing function Sc indicates "1" in the image region (which is on the left side in this example) other than the OSD image Ro, indicates "0" in the image region (which is on the right side in this example) of the OSD image Ro, and linearly changes from "1" to "0" in the extended region B, as illustrated in (B) of FIG. 9. In other words, the image-shift processing function Sc indicates a value of '0' in a region 101 other than a boundary region B1 within a region of the OSD image Ro, and indicates a value of '1' in a region 102 other than a boundary region B2 within a region PL2 (PR2) other than the region of the OSD image Ro. The multipliers 51L and 51R each obtain the product of the parallax control signal Sa ((A) of FIG. 9) and the image-shift processing function Sc ((B) of FIG. 9), and each output the parallax control signal Sl ((C) of FIG. 9). The parallax control signal Sl indicates "A" in the image region (which is on the left side in this example) other than the OSD image Ro, indicates "0" in the image region (which is on the right side in this example) of the OSD image Ro, and linearly changes from "A" to "0" in the extended region B, as illustrated in (C) of FIG. 9. It is to be noted that the image-shift processing function Sc and the parallax control signal Sl change linearly in the extended region B, although the changes in the image-shift processing function Sc and the parallax control signal Sl may be optional as long as the changes are gradual. In one embodiment, the image-shift processing function Sc and the parallax control signal Sl may change in a stepwise fashion, or may change in a curved fashion.

Now, an operation of the stereoscopic display system 2 will be described with reference to an example where the OSD image Ro, which is vertically-long throughout an entire region from one end to the other end of the screen in a perpendicular direction, is superimposed on the input image. In this example, the OSD image Ro is subjected to alpha-blending. That is, the transparent OSD image Ro is superimposed, by which an image, which is before that OSD image Ro is superimposed, is displayed transparently in the image region of the OSD image Ro.

Figure 10:
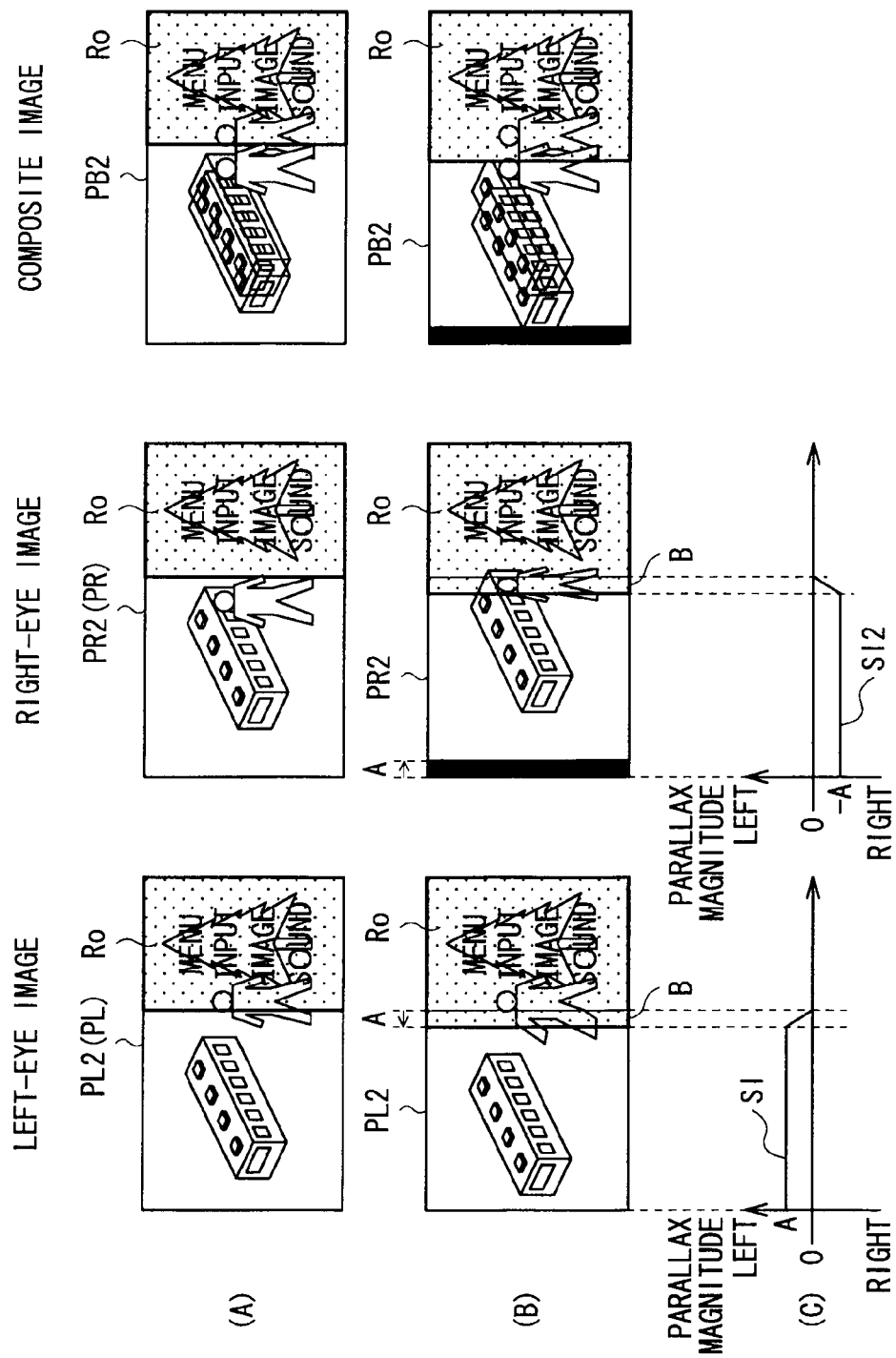
FIG. 10 is an explanatory drawing illustrating an exemplary operation of the parallax adjustment section according to the second embodiment.

FIG. 10 illustrates: the left-eye image PL2 when the vertically-long OSD image Ro is superimposed on the input image; the right-eye image PR2 when the vertically-long OSD image Ro is superimposed on the input image; and the composite image PB2 thereof, in which (A) illustrates a case where the parallax adjustment is not performed in the parallax adjustment section 50, (B) illustrates a case where the parallax adjustment is performed, and (C) illustrates the parallax control signals Sl and Sl2 used when the parallax adjustment of (B) is performed.

As in the first embodiment described above, the parallax adjustment section 50 operates to perform the image shift only on the image region other than the OSD image Ro, and operates not to perform the image shift on the image region of the OSD image Ro, as illustrated in (B) of FIG. 10. Thereby, the parallax adjustment is not performed on the image region of the OSD image Ro, so that the OSD image Ro will not be seen in a doubled fashion as illustrated by the composite image PB2 in (B) of FIG. 10.

Also, the parallax adjustment section 50 so performs the image shifts on the boundary region between the image region of the OSD image Ro and the image region other than the image region of the OSD image Ro, that the parallax magnitude A is changed in a linear fashion. This operation is controlled by the parallax control signals Sl and Sl2 illustrated in (C) of FIG. 10. More specifically, in the left-eye image PL2, the parallax control signal Sl indicates "A" in the image region other than the OSD image Ro, and indicates "0" in the image region of the OSD image Ro. This means that the parallax adjustment section 50 performs the image shift by the parallax magnitude A in the left direction with respect to the image region other than the OSD image Ro, but does not perform the image shift with respect to the image region of the OSD image Ro. Also, the parallax control signal Sl changes linearly from "A" to "0" in the extended region B, which means that the parallax adjustment section 50 so performs the image shift that the parallax magnitude A is changed linearly in the extended region B. Thus, an image of the extended region B is displayed in an enlarged fashion in the horizontal direction. Likewise, in the right-eye image PR2, the parallax control signal Sl2 indicates "−A" in the image region other than the OSD image Ro, and indicates "0" in the image region of the OSD image Ro. This means that the parallax adjustment section 50 performs the image shift by the parallax magnitude A in the right direction with respect to the image region other than the OSD image Ro, but does not perform the image shift with respect to the image region of the OSD image Ro. Also, the parallax control signal Sl2 changes linearly from "−A" to "0" in the extended region B, which means that the parallax adjustment section 50 so performs the image shift that the parallax magnitude A is changed linearly in the extended region B. Thus, an image of the extended region B is displayed in a reduced fashion in the horizontal direction. It is to be noted that the parallax control signal Sl2 is an inversion of the parallax control signal Sl as illustrated in (C) of FIG. 10. That is, the parallax control processing section 42R generates, based on the supplied parallax control signal Sl, the parallax control signal Sl2, and uses the generated parallax control signal Sl2 to perform the image shift discussed above.

As discussed, the stereoscopic display system 2 so performs the image shifts that the parallax magnitude A is changed in a linear fashion in the boundary region between the image region of the OSD image Ro and the image region other than the image region of the OSD image Ro. This is effective particularly when the OSD image Ro is alpha-blended. For example, when a color belonging to a certain point in the OSD image Ro is applied to the extended region B as in the stereoscopic display system 1 according to the first embodiment in a case where an image of a background is displayed transparently through the OSD image Ro, it is likely that the observer 9 feels a displayed image as unnatural, since the extended region B is generated in an uniform color and there is no image that is transparently displayed. In contrast, in the stereoscopic display system 2, the image shifts may be performed in a stepwise fashion on the boundary region between the image region of the OSD image Ro and the image region other than the image region of the OSD image Ro, to perform the process on the extended region B. Thus, the transparently-displayed image is present in the extended region B, making it less likely for the observer 9 to feel the unnaturalness.

According to the second embodiment, the image shifts are so performed that the parallax magnitude A is gradually changed with respect to the boundary region between the region of the OSD image Ro and the region other than the region of the OSD image Ro. Therefore, it is possible to allow the observer less likely to feel the unnaturalness even when the transparent OSD image Ro is superimposed. Other effects achieved by the second embodiment are similar to those according to the first embodiment described above.

Although the technology has been described in the foregoing by way of example with reference to the embodiments, the technology is not limited thereto but may be modified in a wide variety of ways.

For example, in each of the embodiments described above, the stereoscopic display system utilizes the shutter eyeglasses, although it is not limited thereto. In an alternative embodiment, the stereoscopic display system may use polarization eyeglasses.

Also, in each of the embodiments described above, the stereoscopic display system utilizes the dedicated eyeglasses, although it is not limited thereto. In an alternative embodiment, the stereoscopic display system may use a scheme in which the dedicated eyeglasses are not used, such as a lenticular lens scheme and a parallax barrier scheme.

Also, in each of the embodiments described above, the OSD image is laterally or vertically long throughout the entire region from one end to the other end of the screen in the horizontal direction or in the perpendicular direction, although it is not limited thereto. In an alternative embodiment, the OSD image may be located near the center of the display screen without reaching either end of the screen, for example.

Also, in each of the embodiments described above, the OSD image is quadrangle in shape, although it is not limited thereto. In an alternative embodiment, the OSD image may be in any shape such as triangle and circle, or may include only texts.

Figure 11:
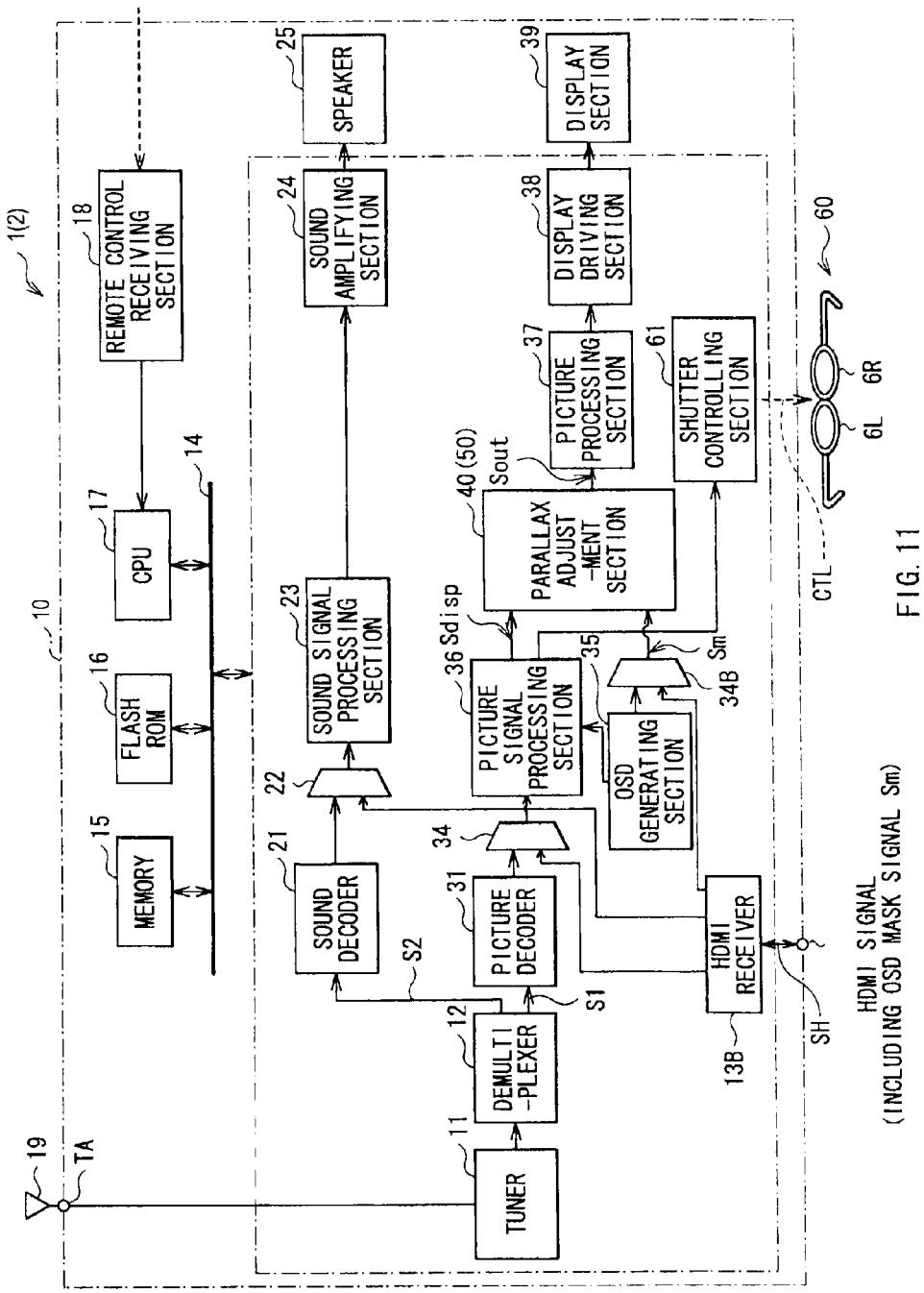
FIG. 11 is a block diagram illustrating an exemplary configuration of a stereoscopic display system according to a modification.

Also, in each of the embodiments described above, the picture signal Sdisp and the OSD mask signal Sm are generated in the stereoscopic display device, although it is not limited thereto. In an alternative embodiment, an external recording-reproducing device such as a Blu-ray Disc (Registered Trade Mark) player may supply the picture signal and the OSD mask signal, for example. FIG. 11 illustrates a modification in which the OSD mask signal is supplied together with the picture signal and the sound signal from an external device by using an HDMI signal. Here, an HDMI receiver 13B corresponds to an illustrative example of an "input section" according to one embodiment of the present disclosure. It is to be noted that the OSD mask signal may be supplied from the external device, separately from the HDMI signal.

Also, for example, when an emergency broadcast such as an emergency earthquake alert is received as the broadcast wave at the same time as the supplying of the OSD mask signal, the parallax adjustment may not be performed, in a manner similar to that in each of the embodiments described above, on a displayed portion of the emergency broadcast, in one embodiment.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. A stereoscopic display device, comprising:
    parallax adjustment circuitry configured to receive a left-eye image and a right-eye image and perform a parallax adjustment on the left-eye image and the right-eye image, each one of the left-eye image and the right-eye image including a first region and a second region, the first region being an On-Screen Display (OSD) image region; and
    display circuitry configured to display an adjusted left-eye image and an adjusted right-eye image which are resultant of the parallax adjustment by the parallax adjustment circuitry,
    wherein the parallax adjustment circuitry is configured to:
        perform the parallax adjustment by, in each one of the left-eye image and the right-eye image,
            shifting only the second region of a respective one of the left-eye image and the right-eye image, and
            extending the first region of the respective one of the left-eye image and the right-eye image when a section of the second region of the respective one of the left-eye image and the right-eye image adjacent to the first region is lost after performing the shifting.

2. The stereoscopic display device according to claim 1, further comprising
    superimposing circuitry configured to superimpose an OSD image on each of a left-eye image and a right-eye image and generate OSD region information that indicates the OSD image region, and then to supply the parallax adjustment circuitry with the OSD region information as well as the left-eye image and the right-eye image each including the superimposed OSD image,
    wherein the parallax adjustment circuitry is configured to determine the second region of the respective one of the left-eye image based on the OSD region information.

3. The stereoscopic display device according to claim 1, further comprising
    input circuitry configured to receive both the left-eye image and the right-eye image as well as OSD region information, the OSD region information indicating the OSD image region,
    wherein the parallax adjustment circuitry is configured to determine the second region of the respective one of the left-eye image and the right-eye image based on the OSD region information.

4. The stereoscopic display device according to claim 1, wherein the parallax adjustment circuitry is configured to extend the first region of the respective one of the left-eye image and the right-eye image by interpolating part of an OSD image that adjoins the lost section of the second region into an area of the lost section.

5. A display method of a stereoscopic display device, the display method comprising:
    receiving a left-eye image and a right-eye image each including a first region and a second region, the first region being an On-Screen Display (OSD) image region;
    performing a parallax adjustment by, in each of the left-eye image and the right-eye image,
        shifting only the second region of a respective one of the left-eye image and the right-eye image, and
        extending the first region when a section of the second region of the respective one of the left-eye image and the right-eye image adjacent to the first region is lost after performing the shifting; and
    displaying an adjusted left-eye image and an adjusted right-eye image which are resultant of the parallax adjustment.

6. The stereoscopic display device according to claim 1, wherein the parallax adjustment includes changing a parallax between the left-eye image and the right-eye image.

7. The stereoscopic display device according to claim 1, wherein the parallax adjustment includes increasing a parallax between the left-eye image and the right-eye image.

8. The stereoscopic display device according to claim 1, wherein the parallax adjustment includes increasing a parallax between the left-eye image and the right-eye image from a first value greater than zero to a second value.

9. The stereoscopic display device according to claim 1, wherein the parallax adjustment circuitry is configured to perform the parallax adjustment linearly in an extended section of the first region.

10. The stereoscopic display device according to claim 1, wherein an extended section of the first region has a width corresponding to a magnitude of a parallax between the left-eye image and the right-eye image.

* * * * *